Dec. 26, 1967 TAKATO TSURU 3,360,263
EXERCISING CYCLE WITH ECCENTRIC BRAKE DRUM
Filed Feb. 12, 1965 2 Sheets-Sheet 1
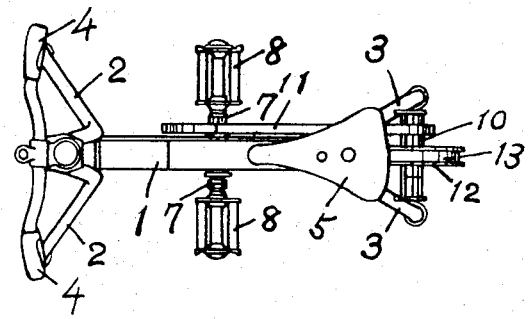
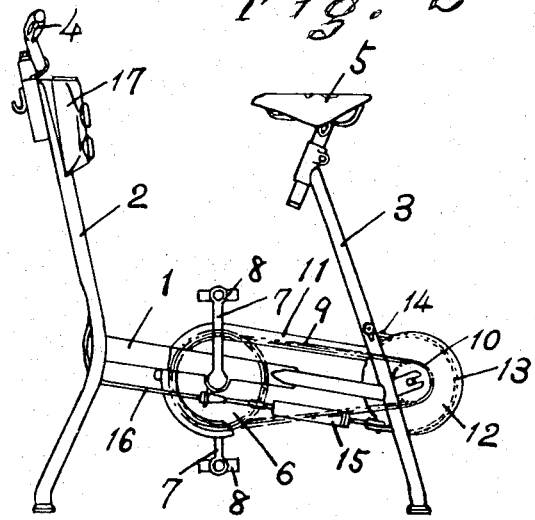

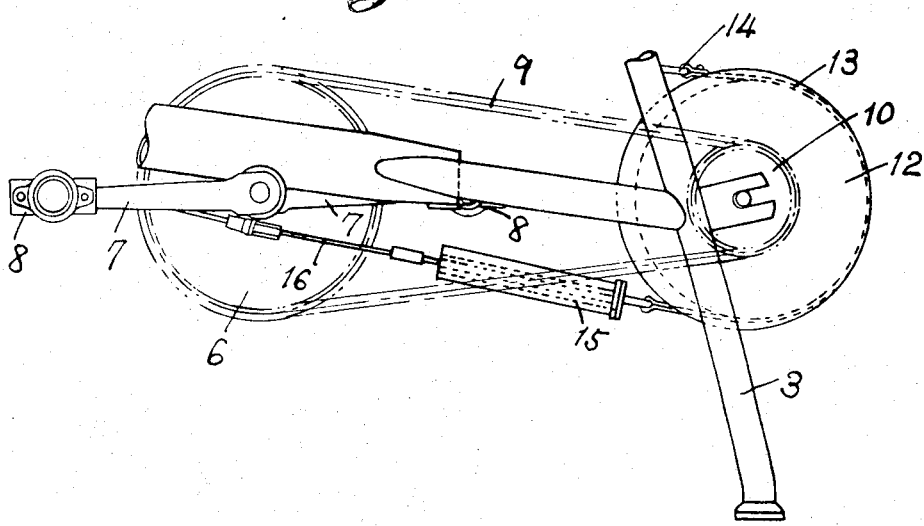

United States Patent Office 3,360,263
Patented Dec. 26, 1967

3,360,263
EXERCISING CYCLE WITH ECCENTRIC
BRAKE DRUM
Takato Tsuru, Ageo, Japan, assignor to Bridgestone Cycle
Kogyo Kabushiki Kaisha, Chuo-ku, Tokyo, Japan
Filed Feb. 12, 1965, Ser. No. 432,125
1 Claim. (Cl. 272—73)

ABSTRACT OF THE DISCLOSURE

In an athletic or exercising apparatus of the stationary cycle type, equalization of the resistance to the rider's propulsion throughout all positions of the pedals is effected by means of an eccentric brake drum fixed coaxially to the driven sprocket wheel which is engaged through a sprocket chain with a driving sprocket wheel fixed coaxially to the pedal crank shaft. The diameter of the driving sprocket wheel is twice that of the driven sprocket wheel. The driving and driven sprocket wheels are so related that when the pedals are positioned vertically the center of the eccentric brake drum lies at the nearest position with respect to the crank shaft whilst when the pedals are positioned horizontally the center of said drum lies at the farthest position with respect to the crank shaft.

---

The present invention relates to an athletic or exercising apparatus for nursing health and beauty for people, more particularly for children and women, by which the merits of whole body training the same as would be performed in an open-door cycling, can be attained through use of a stationary apparatus.

Two types of the same kind of exercising apparatus heretofore have been known. One of them involves pressing a friction wheel against the rotating tire to give a load, while the other utilizes the inertia of a fly-wheel attached to the moving part to effectuate the same condition as open-door cycling. However, the former could not win popularity owing to an unpleasant feeling caused by the changing resistance following the angular position of the pedals driving the crank shaft at its center of rotation, while the latter is most inconvenient to handle, carry and store as well as expensive owing to the additional weight of a fly-wheel.

The object of the present invention is to obviate the defects mentioned above and to provide an athletic exercising apparatus or cycle with which the rider can exercise a comfortable training at a flat or constant resistance to his driving legs unchangeable in spite of the angular position of the pedals at their rotating center, and also convenient for handling, carrying and storing as well as being relatively inexpensive.

The constructive concept is that an eccentric brake drum is fixed coaxially to the driven sprocket wheel, which is arranged to be driven through a sprocket chain from a driving sprocket wheel fixed coaxially to the crank shaft provided with pedals, the diameter of the driven sprocket wheel being one half that of the dirving sprocket wheel, and also said sprocket wheels are so related that when the pedals are situated vertically with respect to journal of the crank shaft, the center of said eccentric brake drum lies at the nearest position to the crank shaft so as to diminish the frictional load, but when said pedals are horizontal the center of said eccentric brake drum lies at the most distant position from said crank shaft so as to increase the frictional load against which the rider must work.

The details of the construction of my invention now will be explained according to the accompanying drawing, in which FIG. 1 is a top plan view of an exercise machine embodying principles of the present invention;
FIG. 2 is a front elevational view of the machine shown in FIG. 1; and
FIG. 3 is a fragmentary view, on a larger scale, of the rear part of the frame and the brake drum seen in FIG. 2.

In the figures, 1 is a main center frame. 2 is the front member of the frame while 3 is the rear member of the frame, these two members being fixed to the front and rear ends of the center frame respectively. 4 denotes the handles (the same as in an ordinary bicycle). 5 is the saddle. 6 is the driving sprocket wheel fixed coaxially to the crank shaft. 7, 8 are the pedals, 9 is a sprocket chain. 10 is the driven sprocket wheel fixed coaxially to the eccentric brake drum 12. The diameter of the driven sprocket wheel is one half that of the driving one. 11 is the chain guard or cover.

13 is a band brake belt. 14 is one end of the said brake belt fixed at that point to the rear member 3, 15 is a case one end of which is connected to the other end of the said brake belt 13. 16 is a cord one end of which is connected to a washer, located in the deep, inner part of said case 15. A spiral spring is provided between said washer and the other end of said case 15 through which said cord 16 passes to connect to said washer penetrating through the interior of said spring. This device is to give a buffering action between said band brake belt 13 and said cord 16. Accordingly, it can be substituted by a simple tension spring member of any kind, solid or pneumatic, as well as by an elastic substance.

The other end of the cord 16 reaches to one of the handles 4 through a tension meter 17 and the tension of the cord 16 is to be controlled by a twist of the handle 4 or the tilting of a small lever attached thereon as usually seen in a bicycle to control the band brake, so that the explanation of such mechanism will be omitted here. At the same time the tension of the cord 16 as well as that of the brake band 13 will be observed at once by the tension meter 17, the construction of which is known to those skilled in cycle construction. In practice, a speed meter of ordinary construction can also be provided thereabout together with said tension meter or such meters can be united in a common meter panel.

The function of this invention is as follows:
The rider sits upon the saddle 5, holding the handles 4 in his hands, and drives the crank shaft with his feet on pedals. At the same time he controls the tension of the band brake belt by moving the handle part through the cord 16 and the spring member 15, until a suitable resistance is generated by friction between the band brake belt 13 and the brake drum 12 meeting the rider's wishes.

Now assuming the tension of the band brake belt 13 is constant, since the two sprocket wheels are so engaged through the chain belt 9 that when the pedals are vertically positioned or at their dead points the center of the eccentric brake drum lies at the nearest point to the crank shaft so as to diminish the tension of the brake band, but when the pedals are positioned horizontally at the level of the crank shaft the center of the brake drum lies at the most distant point from the crank shaft thus increasing the tension of the brake belt and simultaneously the frictional load at the pedals.

Since the diameter of the driven sprocket wheel is one half that of the driving one, the requirement mentioned above will be fulfilled by two rotations of the brake drum during one rotation of the crank shaft. Thus the cycle will give a flat or constant resistance load to the rider's feet as if he were operating in an open-door cycling with a moving inertia, so that the training will become extremely pleasant and as comfortable as or more enjoyable than cycling out-doors.

The present invention provides not only a most rational and comfortable but also light, easy handling, conveniently transferable, as well as low cost athletic cycle to the public.

What I claim is:

In an athletic or exercising device of the stationary cycle type comprising a cycle frame means including a rearwardly disposed upstanding seat-supporting portion, a forwardly disposed upstanding handle bar supporting portion and an intermediate pedal crank shaft supporting portion, pedal crank shaft means rotatably mounted on said pedal crank shaft supporting portion and carrying pedals adjacent its extremities; a driving sprocket wheel mounted on said intermediate portion, and a driven sprocket wheel mounted on said rearwardly disposed portion, said driving and driven sprocket wheels having a sprocket chain trained over them, the diameter of the driven sprocket wheel being one-half that of said driving sprocket wheel, an eccentric brake drum fixed coaxially to said driven sprocket wheel, brake means for frictional engagement by said drum, said driving and driven sprocket wheels being so engaged that when the pedals are positioned vertically the center of said eccentric drum lies at the nearest position to said crank shaft to diminish the frictional resistance by said brake drum but when said pedals are positioned horizontally the center of said eccentric brake drum lies at the farthest position from said crank shaft to increase the frictional resistance by said brake drum, thus varying the resistance to the rider's driving legs throughout every position of the pedals automatically.

References Cited

UNITED STATES PATENTS

| 1,507,554 | 9/1924 | Cooper | 272—73 |
| 1,744,607 | 1/1930 | Baine | 272—73 |
| 3,024,023 | 3/1962 | Steller | 272—73 |

FOREIGN PATENTS

| 21,582 | 1905 | Great Britain. |
| 398,041 | 7/1933 | Great Britain. |

ANTON O. OECHSLE, *Primary Examiner.*

M. R. PAGE, *Assistant Examiner.*